US012086480B2

(12) United States Patent
Yamada

(10) Patent No.: US 12,086,480 B2
(45) Date of Patent: Sep. 10, 2024

(54) INFORMATION PROCESSING APPARATUS AND METHOD, AND STORAGE MEDIUM STORING PROGRAM

(71) Applicant: CANON KABUSHIKI KAISHA, Tokyo (JP)

(72) Inventor: Ruriko Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/478,090

(22) Filed: Sep. 29, 2023

(65) Prior Publication Data

US 2024/0111463 A1 Apr. 4, 2024

(30) Foreign Application Priority Data

Sep. 30, 2022 (JP) .................................. 2022-158761

(51) Int. Cl.
*G06F 3/12* (2006.01)

(52) U.S. Cl.
CPC .......... *G06F 3/1208* (2013.01); *G06F 3/1256* (2013.01); *G06F 3/1257* (2013.01); *G06F 3/1292* (2013.01)

(58) Field of Classification Search
USPC ......................................................... 358/1.2
See application file for complete search history.

(56) References Cited

U.S. PATENT DOCUMENTS

2009/0122151 A1* 5/2009 Katsuyama .......... H04N 23/631
  348/222.1
2020/0004409 A1* 1/2020 Victor ................. G06F 3/04817

FOREIGN PATENT DOCUMENTS

JP 2005102127 A 4/2005

* cited by examiner

*Primary Examiner* — Darryl V Dottin
(74) *Attorney, Agent, or Firm* — Canon U.S.A., Inc. IP Division

(57) ABSTRACT

An information processing apparatus incudes at least one memory and at least one processor configured to cause a display device to display an image indicated by image data; accept a change in an original size of the image displayed on the display device; in a case where a change from a first original size to a second original size that is different from the first original size in an aspect ratio has been accepted as the change, change a layout of an object included in the image data based on the second original size; and cause the display device to display the image in the second original size based on the object whose layout has been changed.

11 Claims, 19 Drawing Sheets

| SHEET SIZE | HORIZONTAL SIZE | VERTICAL SIZE |
|---|---|---|
| A4 | 210mm | 297mm |
| A3 | 297mm | 420mm |
| A2 | 420mm | 594mm |
| 24" x 36" | 609.6mm | 914.4mm |
| Letter | 215.9mm | 279.4mm |

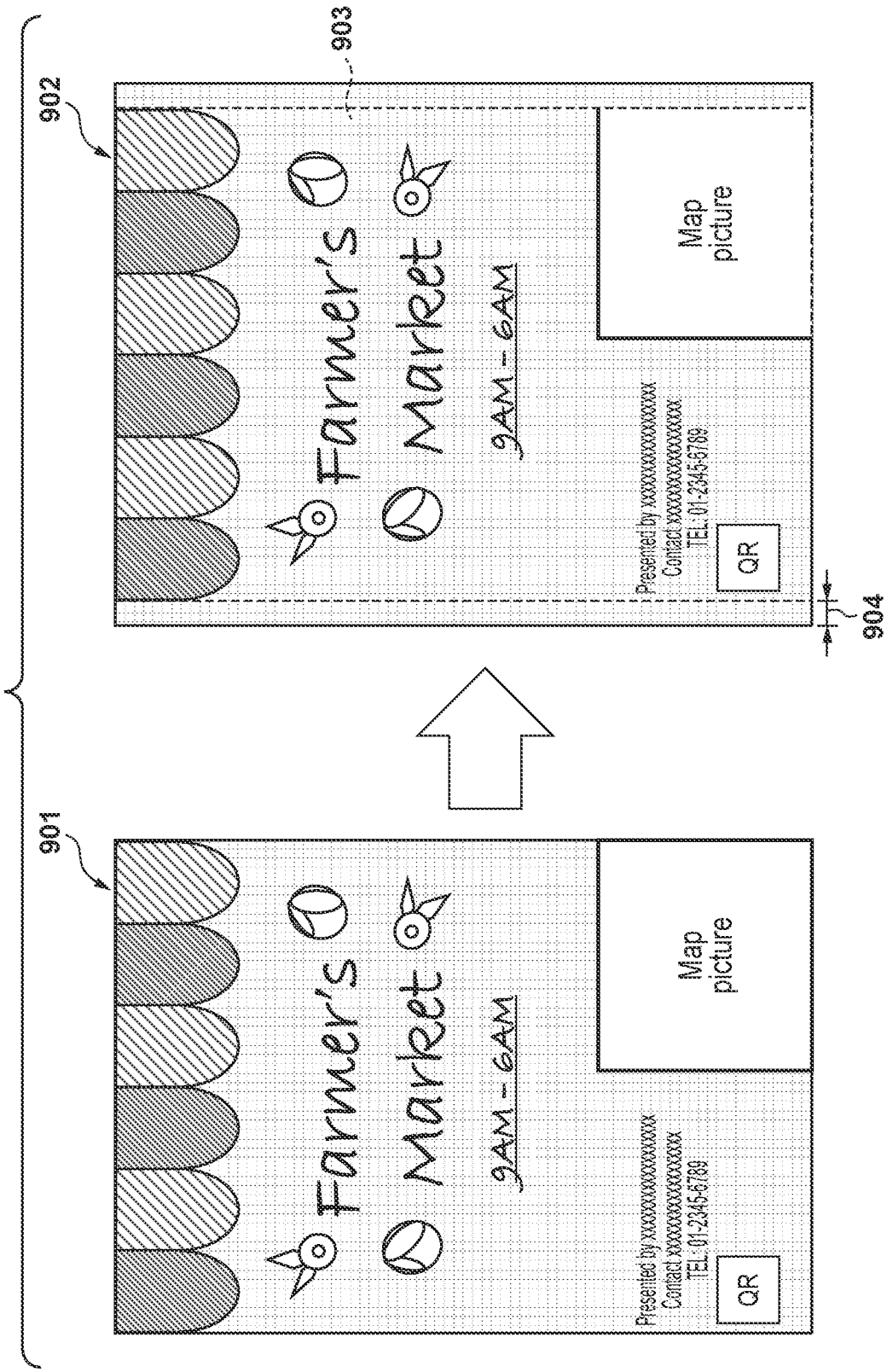

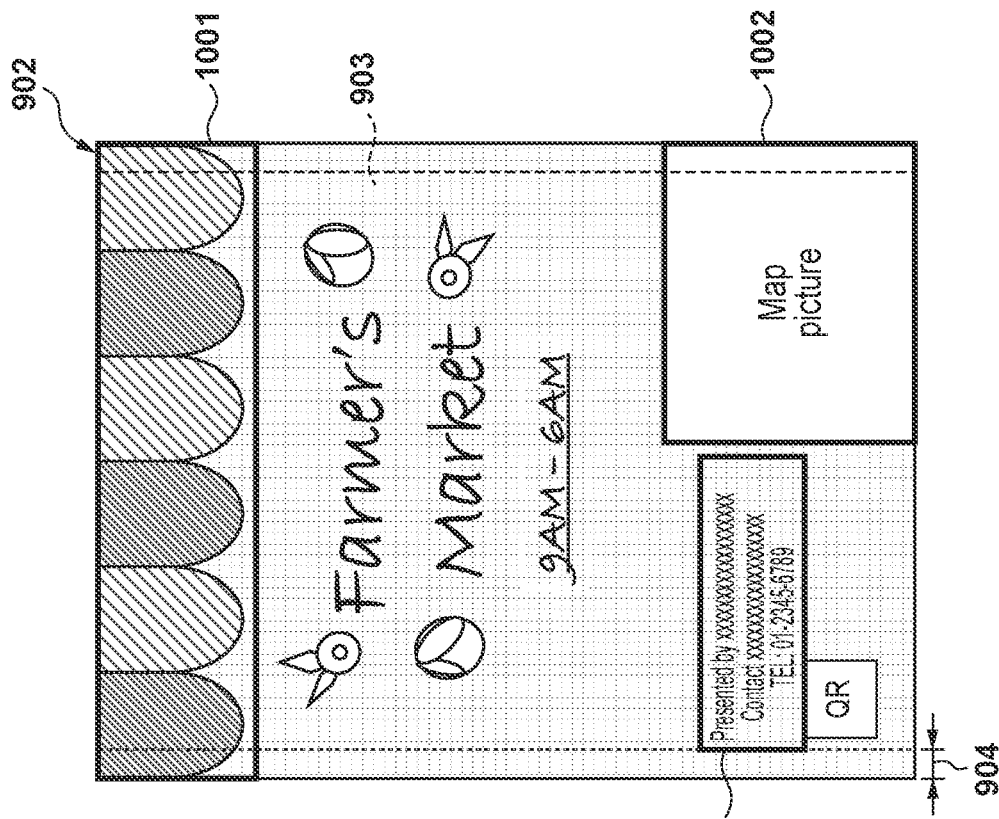
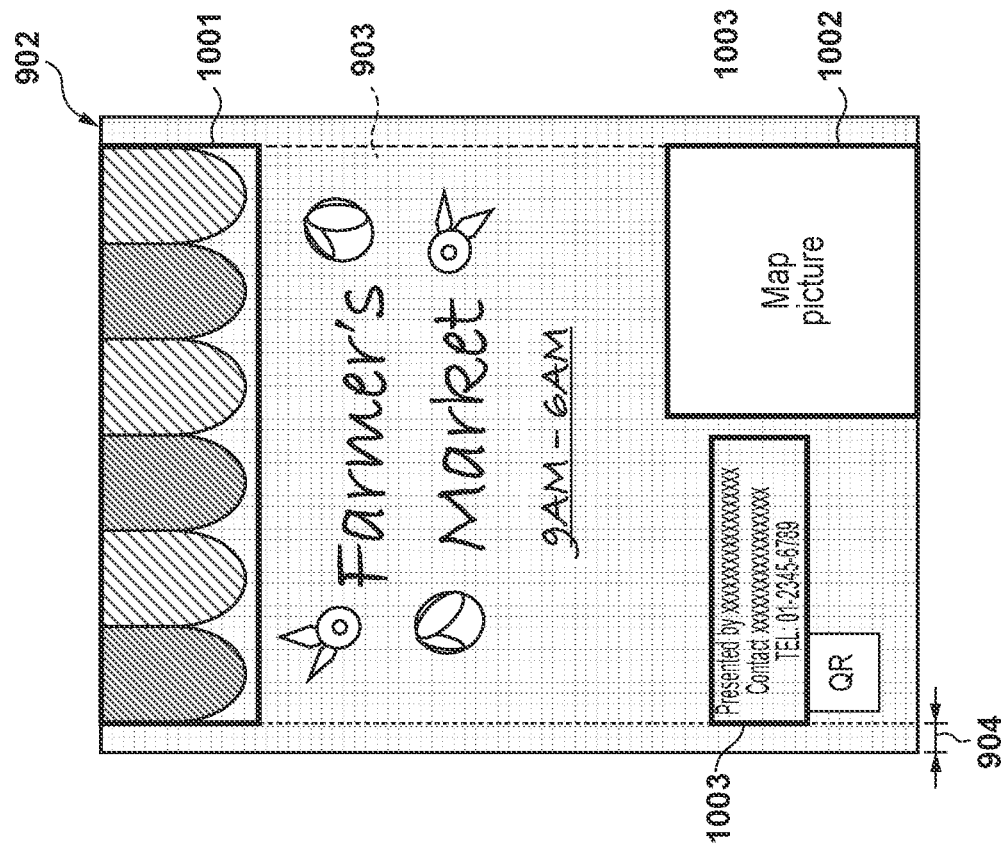

FIG. 20

| TEMPLATE ID | DEFAULT SIZE | USA | JP |
|---|---|---|---|
| A | A4 | Letter | A4 |
| B | A4 | Letter | A4 |
| C | A2 | Medium | A2 |
| D | A2 | Medium | A2 |
| E | A3 | Small | A3 |

INFORMATION PROCESSING APPARATUS AND METHOD, AND STORAGE MEDIUM STORING PROGRAM

BACKGROUND

Field

The present disclosure relates to an information processing apparatus and method that can perform image editing, and to a storage medium storing a program.

Description of the Related Art

In recent years, there are increasing cases where posters, name cards, pamphlets, and the like are edited and printed. In a case where a user wishes to generate and edit poster images and like with ease, he/she uses template data in which a layout of objects, such as text and images, has been defined. It is described in Japanese Patent Laid-Open No. 2005-102127 that, with regard to template data that defines a layout of objects, the size that can be changed relative to a template is limited to the size with the same or similar aspect ratio.

Japanese Patent Laid-Open No. 2005-102127 does not mention a case where the size is changed to the original size with a different aspect ratio.

SUMMARY

The present disclosure provides an information processing apparatus and method that improve convenience in a case where the size is changed to the original size with a different aspect ratio, and a storage medium storing a program.

The present disclosure in one aspect provides an information processing apparatus comprising at least one memory and at least one processor configured to cause a display device to display an image indicated by image data; accept a change in an original size of the image displayed on the display device; in a case where a change from a first original size to a second original size that is different from the first original size in an aspect ratio has been accepted as the change, change a layout of an object included in the image data based on the second original size; and cause the display device to display the image in the second original size based on the object whose layout has been changed.

According to the present disclosure, convenience can be improved in a case where the size is changed to the original size with a different aspect ratio.

Further features of various embodiments will become apparent from the following description of exemplary embodiments with reference to the attached drawings.

BRIEF DESCRIPTION OF THE DRAWINGS

FIG. 8 is a diagram showing a table that defines original sizes.

FIG. 9 is a diagram for describing a change in an original size.

FIG. 10 is a diagram showing a layout of each object.

FIG. 11 is a diagram showing a layout of each object.

FIG. 20 is a diagram showing a table that defines template sizes.

DESCRIPTION OF THE EMBODIMENTS

Figure 1:
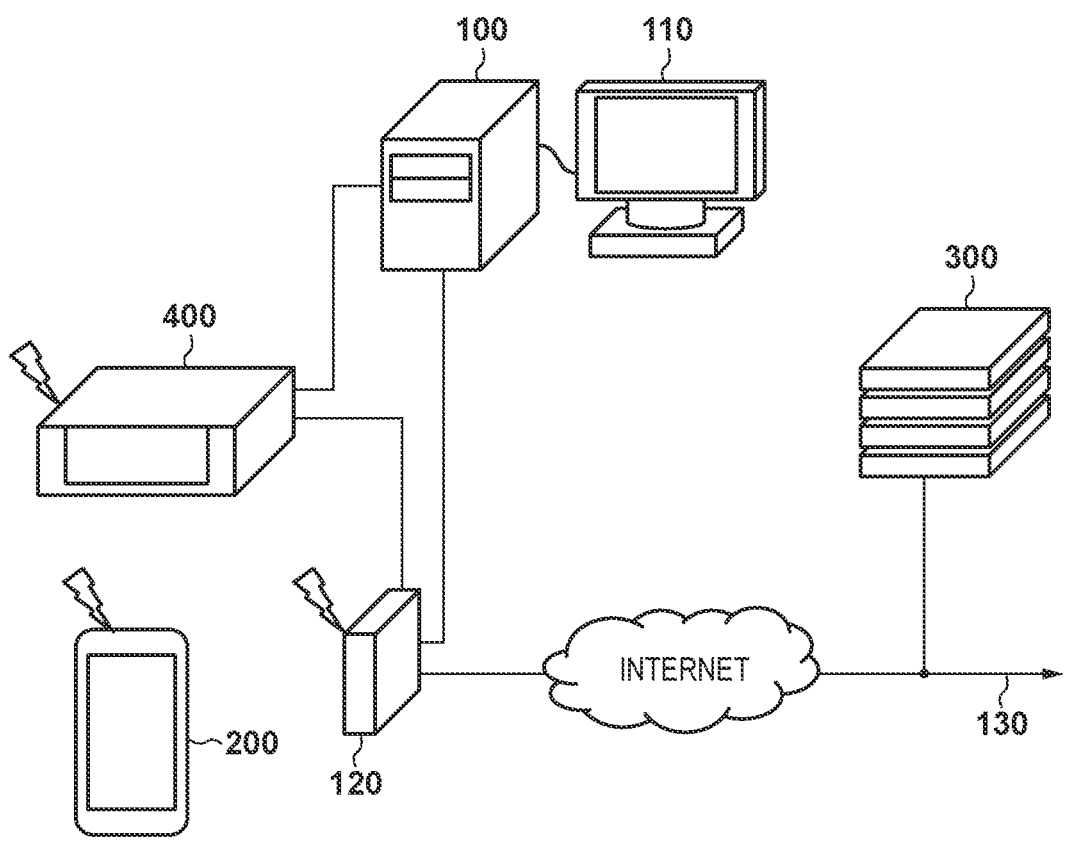
FIG. 1 is a diagram showing a configuration of a printing system.

Hereinafter, embodiments will be described in detail with reference to the attached drawings. Note, the following embodiments are not intended to limit the scope of the claims. Multiple features are described in the embodiments, but limitation is not made to embodiments that require all such features, and multiple such features may be combined as appropriate. Furthermore, in the attached drawings, the same reference numerals are given to the same or similar configurations, and redundant description thereof is omitted.

First Embodiment

FIG. 1 is a diagram showing an example of a configuration of a printing system according to the present embodiment. The present printing system includes a client computer (hereinafter, PC) 100, a display (display apparatus) 110, a router 120, a mobile terminal 200, a server computer (hereinafter, server) 300, and a printer 400. The PC 100 is connected to the display 110 via a communication cable, and displays various types of user interface screens on the display 110 for a user of the PC 100. Not only the PC 100 itself, but also the set of the PC 100 and the display 110 may be referred to as an information processing apparatus. Furthermore, the PC 100 is connected to the router 120 via wired communication or wireless communication, and can mutually communicate with other communication devices over the Internet 130 via the router 120. The mobile terminal 200 can mutually communicate with other communication devices over the Internet 130 via the router 120 by way of wireless communication. The server 300 is, for example, a Web server that provides a Web application that enables the user to generate/edit content data to be printed. The server 300 can mutually communicate with other communication devices over the Internet 130. Also, the server 300 can receive data held in the PC 100 or the mobile terminal 200, store the data into a memory, edit the data, and transmit the data to other devices, such as the PC 100. The printer 400 receives data held in the PC 100, mobile terminal 200, or server 300, and performs printing on a printing medium, such as a printing sheet.

In the printing system of FIG. 1, the user of the PC 100 can print a content that has been generated using the Web application of the server 300 on the printer 400. Furthermore, the user of the PC 100 can print a content to be printed on the printer 400 with use of a native application that has been installed in the PC 100 in advance, without using the Web application of the server 300. The user of the PC 100 can associate the Web application with the native application in advance in such a manner that they can coordinate with each other, and print a content that has been generated using the Web application on the printer 400 via the native application. In the present embodiment, regardless of each of the aforementioned modes, an application that is intended for the user to print a content on the PC 100 is simply referred to as an "application". The following describes hardware configurations of the respective apparatuses of FIG. 1.

Figure 2:
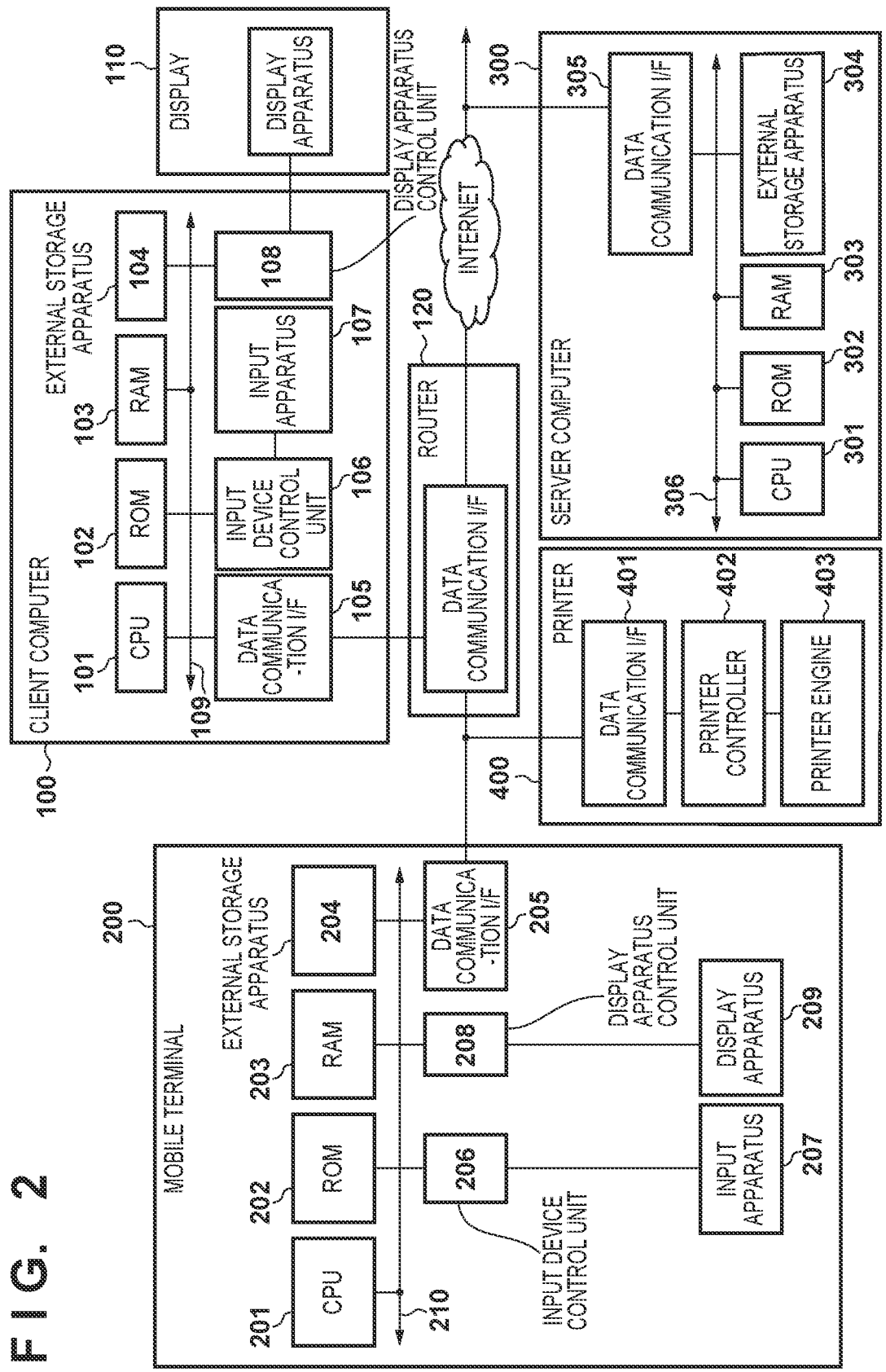
FIG. 2 is a diagram showing hardware configurations of respective apparatuses in the printing system.

FIG. 2 is a diagram showing examples of hardware configurations of the respective apparatuses in the printing system of FIG. 1. First, the hardware configuration of the PC 100 will be described. A CPU 101 is a central processing unit, and integrally controls the PC 100, which is the information processing apparatus. A ROM 102 is a nonvolatile storage, and holds various types of data, programs, and tables. The ROM 102 stores, for example, a basic program and various types of application programs. The application programs include, for example, a printing application program that has been downloaded from an external server and installed, and a front end program on the Web application of the server 300. A RAM 103 is a volatile storage, and temporarily holds programs and data. An external storage apparatus 104 is a nonvolatile storage, such as a hard disk drive (HDD) and a solid-state drive (SSD), and holds programs and data. The CPU 101 executes various types of processing based on the programs and data stored in the ROM 102, RAM 103, and external storage apparatus 104. For example, the operations of the PC 100 in the present embodiment are realized by the CPU 101 reading out the programs stored in the ROM 102 into the RAM 103 and executing the programs.

A data communication interface (I/F) 105 executes data communication with external devices. For example, the data communication I/F 105 controls transmission and reception of data between the server 300 and the printer 400 via the router 120. For example, a wired connection method, such as USB, IEEE 1394, and LAN, or a wireless connection method, such as Bluetooth® and WiFi®, is used as a data communication method. An input device control unit 106 obtains information related to a user operation that has been accepted via an input apparatus 107, and transmits this information to the CPU 101. The input apparatus 107 is a human interface device (HID), such as a keyboard and a mouse. A display apparatus control unit 108 converts screen data for a user interface screen and the like into rendering data, transmits the rendering data to the display 110, and causes the rendering data to be displayed. The discrete blocks inside the PC 100 are connected to one another via an internal bus 109. The PC 100 is not limited to having the configuration shown in FIG. 2, and has a configuration corresponding to the functions that can be executed by a device applied as the PC 100 as appropriate.

Next, the hardware configuration of the mobile terminal 200 will be described. The mobile terminal 200 mainly includes the functions of an information processing apparatus, such as a tablet computer and a smartphone, and includes a touch panel that functions as both a display and an input I/F. A CPU 201 is a central processing unit, and integrally controls the mobile terminal 200. A ROM 202 is a nonvolatile storage, and holds various types of data and programs. The ROM 202 stores, for example, a basic program and various types of application programs. A RAM 203 is a volatile storage, and temporarily holds programs and data. An external storage apparatus 204 is a nonvolatile storage, such as a hard disk drive (HDD) and a solid-state drive (SSD), and holds programs and data. The external storage apparatus 204 may be configured to be externally attachable. The CPU 201 executes various types of processing based on the programs and data stored in the ROM 202, the RAM 203, and the external storage apparatus 204. For example, the operations of the mobile terminal 200 in the present embodiment are realized by the CPU 201 reading out the programs stored in the ROM 202 into the RAM 203 and executing the programs.

A data communication I/F 205 executes data communication with external devices. For example, a wired connection method, such as USB, IEEE 1394, and LAN, or a wireless connection method, such as Bluetooth and Wi-Fi, is used as a data communication method. An input device control unit 206 obtains information related to a user operation that has been accepted via an input apparatus 207, and transmits this information to the CPU 201. The input apparatus 207 is, for example, an apparatus that can accept an input operation on a screen, such as a touch panel that is provided on a tablet computer or a smartphone and has display and input functions. A display apparatus control unit 208 converts screen data for a user interface screen and the like into rendering data, and causes this rendering data to be displayed on a display apparatus 209. The discrete blocks inside the mobile terminal 200 are connected to one another via an internal bus 210. The mobile terminal 200 is not limited to having the configuration shown in FIG. 2, and has a configuration corresponding to the functions that can be executed by a device applied as the mobile terminal 200 as appropriate.

First, the hardware configuration of the server 300 will be described. A CPU 301 is a central processing unit, and integrally controls the server 300. A ROM 302 is a nonvolatile storage, and holds various types of data and programs. The ROM 302 stores, for example, a basic program and various types of application programs. The application programs include, for example, a printing application that the user can downloaded. A RAM 303 is a volatile storage, and temporarily holds programs and data. An external storage apparatus 304 is a nonvolatile storage, such as a hard disk drive (HDD) and a solid-state drive (SSD), and holds programs and data. For example, the operations of the server 300 in the present embodiment are realized by the CPU 301 reading out the programs stored in the ROM 302 into the RAM 303 and executing the programs.

A data communication OF 305 executes data communication with external devices. For example, the data communication I/F 305 controls transmission and reception of data between the PC 100 and the printer 400 via the router 120. For example, a wired connection method, such as USB, IEEE 1394, and LAN, or a wireless connection method, such as Bluetooth and Wi-Fi, is used as a data communication method. The discrete blocks inside the server 300 are connected to one another via an internal bus 306. The server 300 is not limited to having the configuration shown in FIG. 2, and has a configuration corresponding to the functions that can be executed by a device applied as the server 300 as appropriate.

Next, the hardware configuration of the printer 400 will be described. A data communication I/F 401 executes data communication with external devices. For example, the data communication I/F 401 controls transmission and reception of data between the PC 100 and the server 300 via the router 120. For example, a wired connection method, such as USB, IEEE 1394, and LAN, or a wireless connection method, such as Bluetooth and Wi-Fi, is used as a data communication method.

The printer 400 can receive print data that has been generated by the PC 100, mobile terminal 200, and server 300, and execute printing on a printing medium. Note that the print data includes image data to be printed, and print setting data in which print settings have been defined. A printer controller 402 controls a printer engine 403 based on print data received from an external device.

The printer controller 402 executes, for example, color space conversion corresponding to a sheet type defined by the print setting data, processing for separating colors into color materials, and so forth with respect to the image data, thereby generating printing data that can be processed by the printer engine 403. Furthermore, the printer controller 402 executes image processing, such as output tone correction and halftoning, using an image processing parameter, such as a lookup table.

The printer engine 403 converts image data of the print data into ink color data pieces corresponding to respective inks that are used inside the printer 400, and executes print processing. Note that the printer engine 403 has a configuration corresponding to a printing method of the printer 400. For example, in the present embodiment, an inkjet printer that performs printing on a printing medium using an inkjet printing method is assumed as the printer 400. In this case, the printer engine 403 is configured to include ink tanks that each retain ink, and a print head provided with a row of nozzles that eject ink drops. The print processing performs control so as to eject ink drops from the nozzles by controlling, for example, a heating operation of a heater mounted on the print head based on printing data.

The printer 400 is not limited to having the configuration shown in FIG. 2, and has a configuration corresponding to the functions that can be executed by a device applied as the printer 400 as appropriate. Also, the printer 400 is not limited to a printer that uses the inkjet printing method, and may be a printer that uses another printing method, such as an electrophotographic method. Furthermore, the printer 400 may be a multi-functional peripheral (MFP) in which the functions of a scanner, a facsimile machine, and the like are integrally configured.

The server 300 is, for example, a Web server that provides a Web application that enables the user to generate and edit content data to be printed (e.g., poster image data). In this case, software of the server 300 is configured to include a frontend and a backend that perform display control for a Web browser of the PC 100 and the like. The frontend manages/holds a program (JavaScript) executed on the Web browser; for example, the Web browser of the PC 100 performs corresponding display as a result of transmission (downloading) of the program to the PC 100. The frontend includes, for example, a program for performing user authentication, and a program for executing processing for generating/editing a content. Note that in a state where a program of the frontend has been downloaded on the PC 100, this program constitutes a part of a software configuration of the PC 100.

In the present embodiment, a native application that has been installed on the PC 100 in advance is assumed as an example of an application that enables content data to be generated and edited. Note that a printer driver corresponding to the printer 400 has been installed on the PC 100. However, it is permissible to adopt a configuration in which the user generates/edits a content, such as a poster, using the frontend on the PC 100 side, and the backend on the server 300 side executes rendering processing. In this case, upon accepting a print instruction from the user, the frontend instructs the backend to perform printing based on print settings for the printer driver, and also transmits content data that has been generated/edited by the user to the backend. The backend executes rendering processing with respect to the transmitted content data, and transmits the content data to the PC 100. The content data that has undergone the rendering processing is printed on a printer corresponding to the printer driver.

Figure 3:
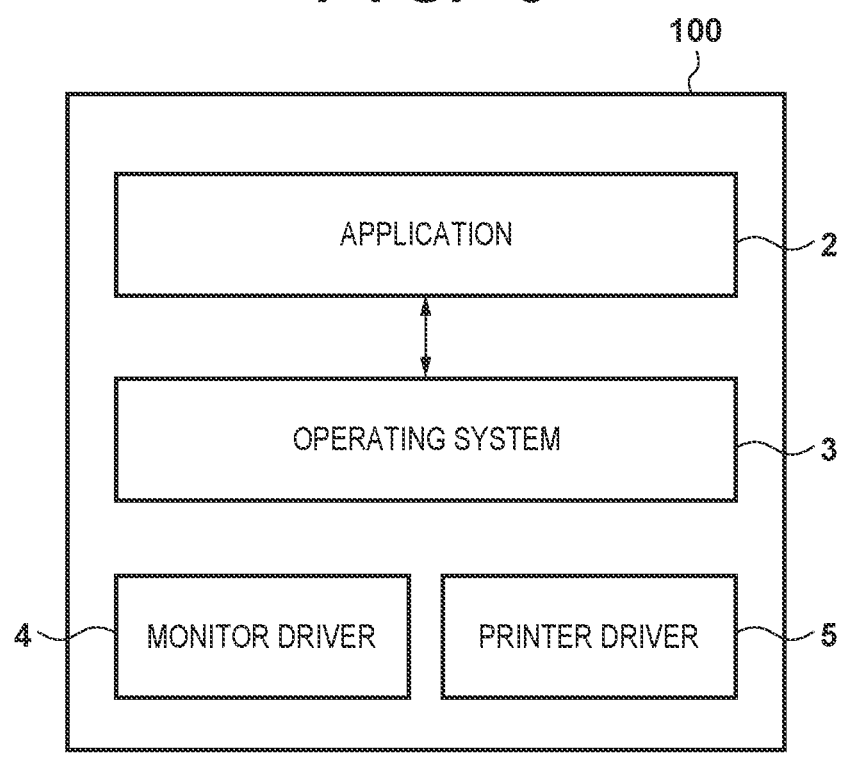
FIG. 3 is a diagram showing constituents of software of a PC 100.

FIG. 3 is a diagram showing examples of constituents of software of the PC 100. The PC 100 includes an application 2, an operating system 3, a monitor driver 4, and a printer driver 5 as software constituents.

In the present embodiment, the application 2 is, for example, an application for editing a poster. Note that although the application 2 is assumed to be a native application that has been installed on the PC 100 in advance, it may be a program of the frontend of the Web application. The application 2 issues a group of various types of rendering processing commands (an image rendering command, a text rendering command, a graphics rendering command, and so on) for outputting the result of execution of, for example, generation and editing processing. Then, the group of rendering commands issued by the application 2 is input to the monitor driver 4 via the operating system 3. Also, in a case where the group of rendering processing commands is related to printing, the group of rendering commands issued by the application 2 is input to the printer driver 5 via the operating system 3. The printer driver 5 is software for generating print data by processing the input group of rendering processing commands, and causing the printer 400 to print the print data. Furthermore, the monitor driver 4 is software for generating display data by processing the input group of rendering processing commands, and causing the display 110 to display the display data.

The application 2 generates output image data using text data that is categorized as text, such as characters, graphics data that is categorized as graphics, such as shapes, and image data that is categorized as images and the like. The output image data can be displayed on the display 110. For example, the application 2 displays a poster image of the output image data to be generated and edited by the user on a user interface screen of the application 2. Also, in a case where a user instruction has been accepted on the user interface screen and an image based on the output image data is to be printed, the application 2 requests the operating system 3 for printing and outputting. In these cases, a group of rendering processing commands in which a text data portion is composed of a text rendering command, a graphics data portion is composed of a graphics rendering command, and an image data portion is composed of an image rendering command, is issued to the operating system 3.

The following describes the user interface screen that is displayed by the application 2 and enables the user to generate and edit a poster image.

Figure 4:
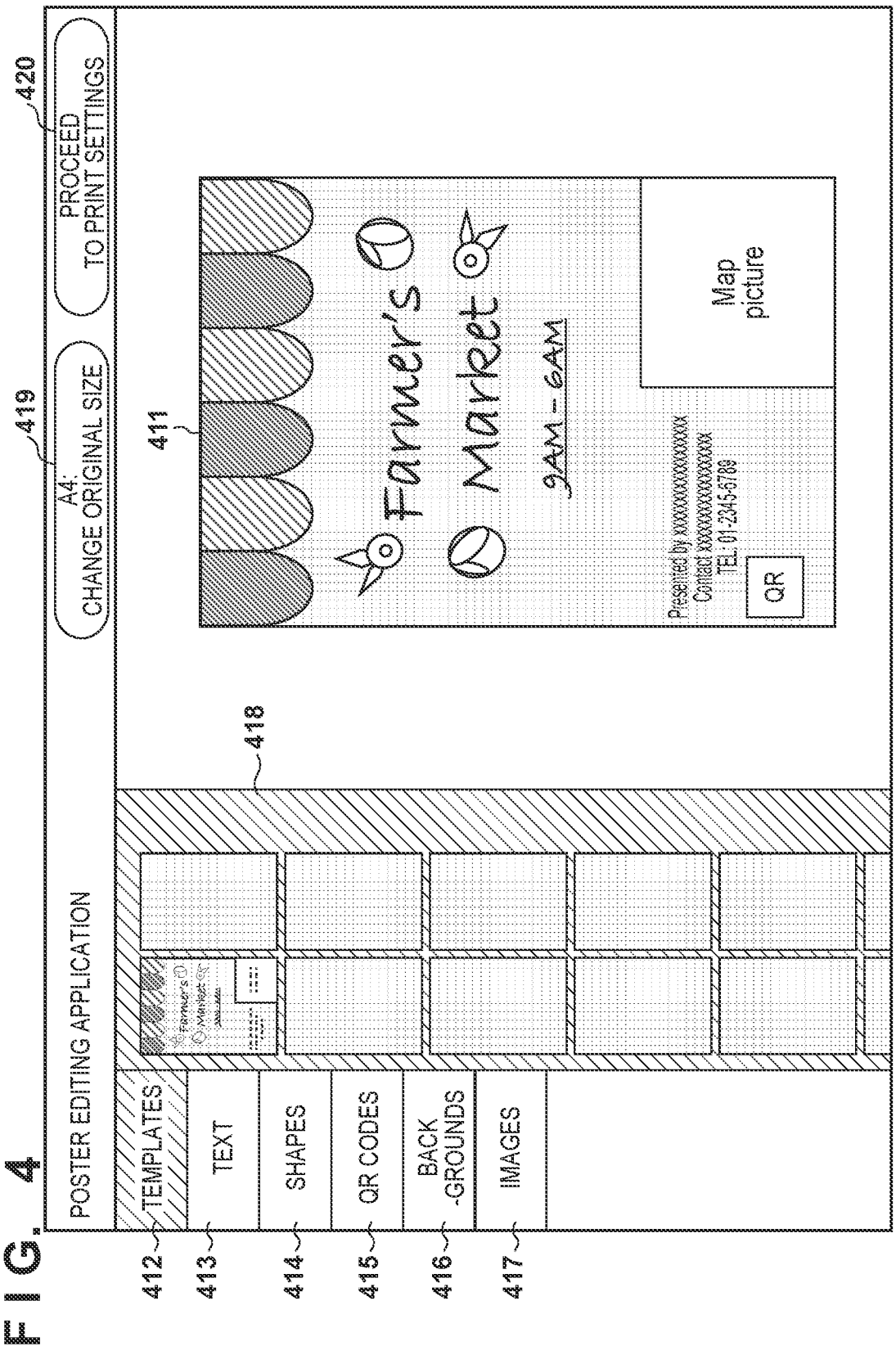
FIG. 4 is a diagram showing a user interface screen.

FIG. 4 is a diagram showing an example of a configuration of an editing screen with a function of arranging objects on a poster image and editing the objects, which is realized by the above-described application 2. A poster image 411 represents one page of a poster image that is currently edited. The user can generate a poster image by selecting templates and objects from tabs 412 to 417 and arranging them on the poster image 411.

The tab 412 is a button that can accept an instruction for display of a template list. When the user has selected the tab 412, a template list that can be reflected in the poster image 411 is displayed in a region 418. When the user has selected a template from the template list, the selected template is reflected in the poster image 411.

The tabs 413 to 417 are buttons that can accept an instruction for addition of various types of objects to the poster image 411. When the user has selected the tab 413, a list of text that can be added to the poster image 411 is displayed in the region 418. When the user has selected the tab 414, a list of shapes that can be added to the poster image 411 is displayed in the region 418. When the user has selected the tab 415, a list of two-dimensional codes (e.g., QR Codes®) that can be added to the poster image 411 is displayed in the region 418. When the user has selected the tab 416, a list of backgrounds that can be added to the poster image 411 is displayed in the region 418. When the user has selected the tab 417, a list of images that can be added to the poster image 411 is displayed in the region 418. The user can arrange various types of contents selected via the tabs 412 to 417 on the poster image 411 by performing, for example, a drag-and-drop operation.

When the user has selected a button 420 of FIG. 4, a print setting screen (not shown) for printing the poster image for which an editing operation has been performed is displayed. When the user has set a sheet type and the like and issued an instruction for executing printing on the print setting screen, the application 2 issues a group of various types of rendering processing commands based on the output image data, and the group of various types of rendering processing commands is input to the printer driver 5 via the operating system 3. The printer driver 5 generates print data by processing the input group of rendering processing commands, and transmits the print data to the printer 400. The printer 400 executes printing of the poster image based on the print data received from the printer driver 5.

Figure 5:
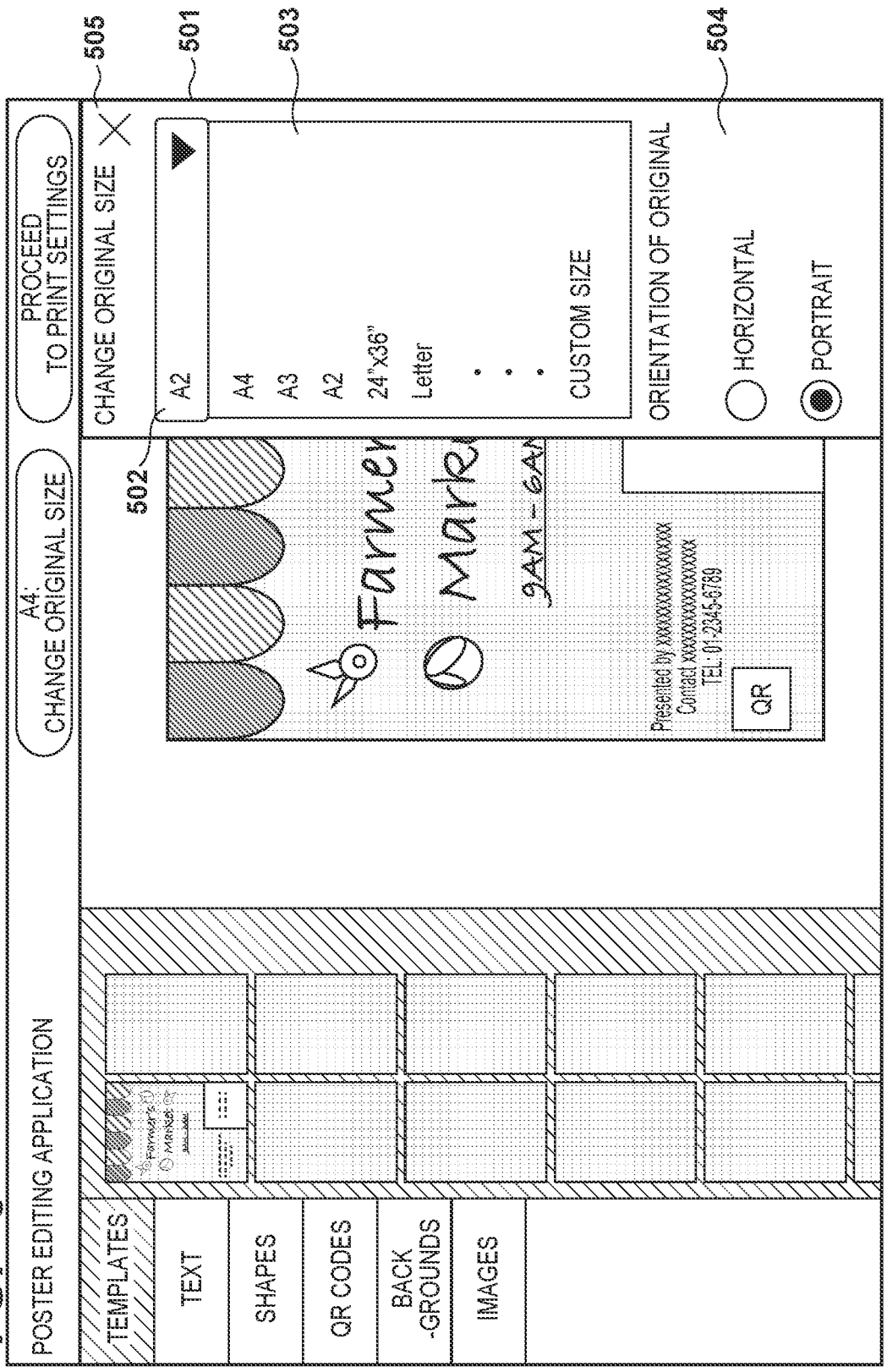
FIG. 5 is a diagram showing a user interface screen.

FIG. 5 is a diagram showing an example of a screen that is displayed in a case where the user has selected a button 419 on the editing screen of FIG. 4. A region 501 is a region for changing an original size. A button 502 is displayed in the region 501. The button 502 shows a current original size of the poster image 411. FIG. 5 depicts a state where "A2", which is currently set, is shown.

A region 503 is a drop-down list that is displayed in a case where the button 502 has been pressed, and displays selection candidates for the original size. The user selects an original size from the drop-down list; as a result, for example, the current original size of the poster image 411, namely "A2", can be changed to the original size that has been selected from the drop-down list.

When the user has selected an original size from the drop-down list, the button 502 shows the selected original size. Furthermore, when the user has selected a "custom size" in the region 503, the user can change the lengths of the short sides and the long sides of the poster image at his/her own will.

A designation of the orientation of the original can be accepted in a region 504. FIG. 5 depicts a state where "portrait" has been selected. When the user has changed the orientation of the original, this change is reflected in the poster image 411. When the user has pressed a button 505, the application 2 closes the region 501.

As described above, according to the application 2, the original size of the poster image 411 can be changed by a user operation that has been performed with respect to the region 501. The present embodiment is described in relation to a case where the user changes the original size of the poster image 411 from "A4" to "Letter" as one example. Note that although the above size change is described as one example, no limitation is intended by the above example. Other original sizes may be used as long as the aspect ratio of the pre-change original size is different from the aspect ratio of the post-change original size.

Figure 6:
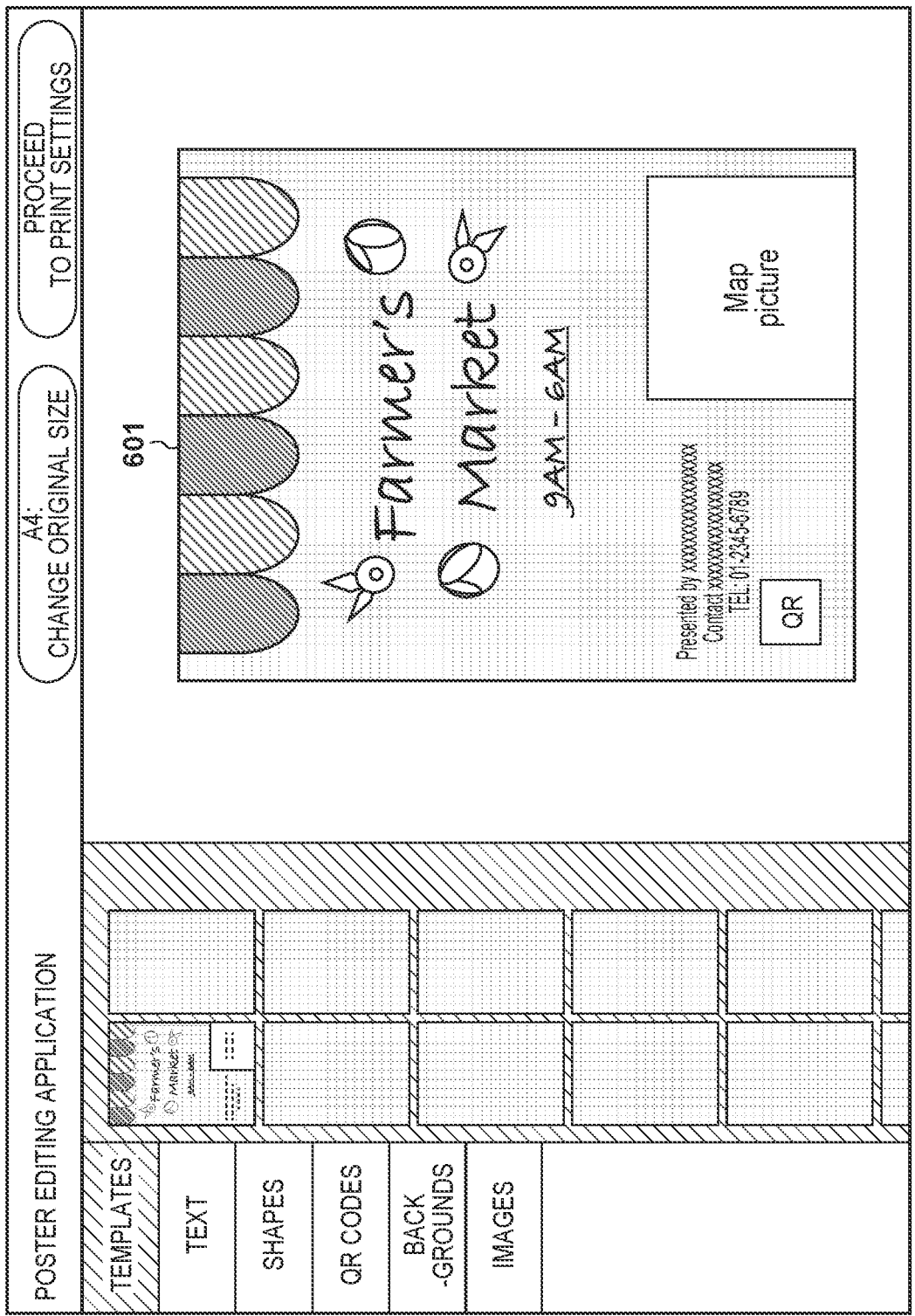
FIG. 6 is a diagram showing a user interface screen.

FIG. 6 is a diagram showing an example of a screen after the original size of the poster image 411 has been changed. A poster image 601 represents a poster image after the original size has been changed from "A4" to "Letter". In a case where "A4" is changed to "Letter", "A4" and "Letter" differ from each other in the aspect ratio. Therefore, if the layout of objects under the "A4" size is maintained under the "Letter" size, the layout after the conversion has margins on the left and the right as shown in the poster image 601. In this case, the user needs to make a correction to achieve a layout that is optimal for the poster image with the original size "Letter" by moving each one of the objects. In view of this, the present embodiment is described in relation to a configuration for changing the original size without the user performing redoing operations.

Figure 7:
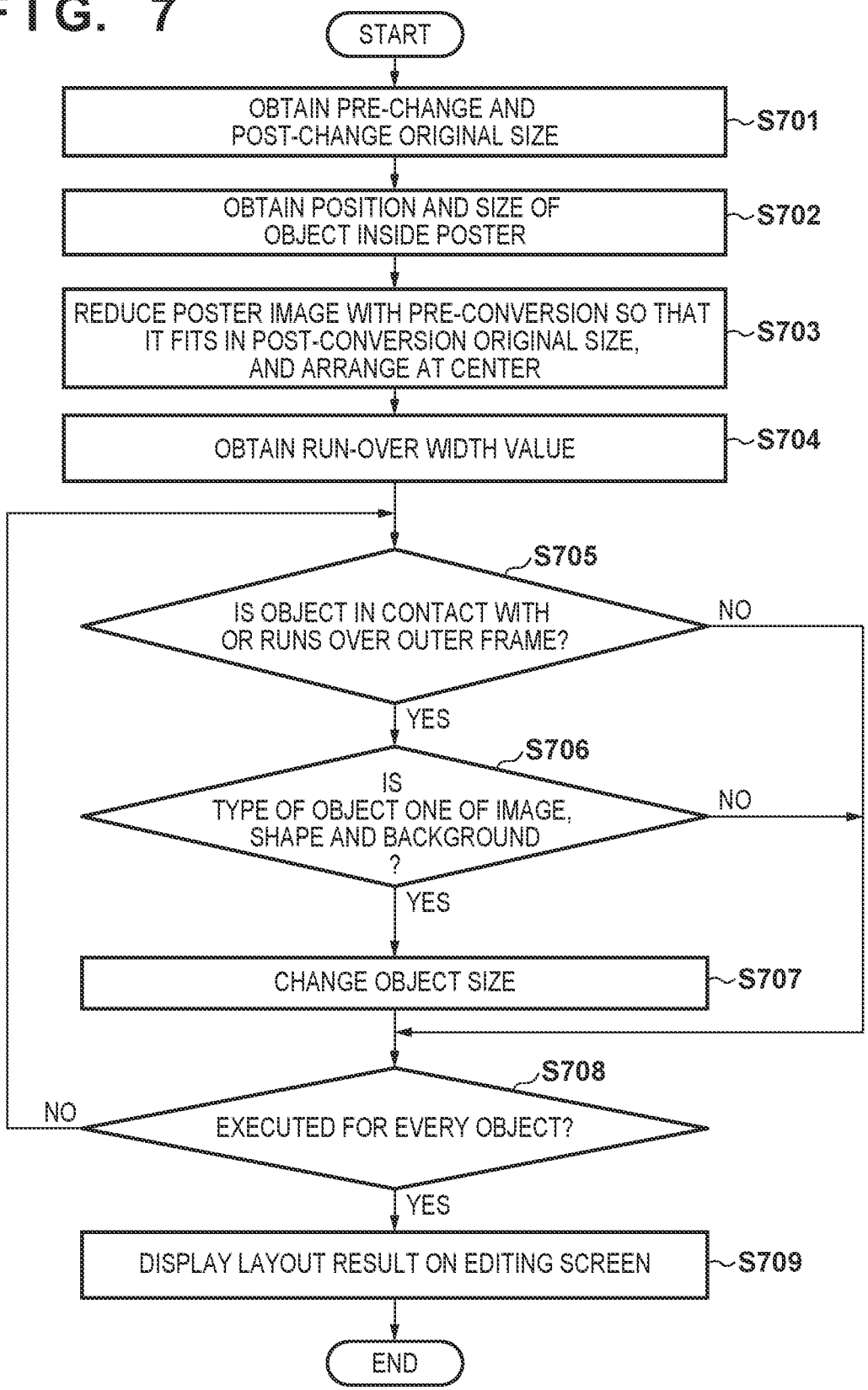
FIG. 7 is a flowchart showing processing for changing an original size.

FIG. 7 is a flowchart showing processing for changing the original size on the application 2. The processing of FIG. 7 is realized by, for example, the CPU 101 reading out a program stored in the ROM 102 and executing the program.

In step S701, the CPU 101 obtains the pre-change original size and the post-change original size. For example, the CPU 101 obtains the pre-change original size and the post-change original size based on settings of the region 501. In the present embodiment, it is assumed that the pre-change original size is "A4", and the post-change original size is "Letter". Note that the application 2 holds a table 801 shown in FIG. 8. In the table 801, the names of the original sizes are tied to the widths (horizontal) and the heights (vertical). The CPU 101 obtains, from the table 801, the width and the height tied to the name of the original size set in the region 501. Note that the original sizes in the table 801 of FIG. 8 are examples, and no limitation is intended by these sizes.

In step S702, the CPU 101 obtains the position (coordinates) and size information of each object inside the poster image with the pre-change original size. Note that in obtaining the position, a circumscribed quadrilateral region of each object is extracted, and the position is obtained based on this circumscribed quadrilateral region. In step S703, the CPU 101 reduces the poster image with the pre-conversion original size so that it fits in the post-conversion original size, and arranges the poster image at the center of the post-conversion original size.

FIG. 9 is a diagram showing examples of the poster image with the pre-conversion original size, and the poster image with the post-conversion original size. A poster image 901 is the poster image with the pre-conversion original size "A4". A poster image 902 is the poster image with the post-conversion original size "Letter". According to the table 801 of FIG. 8, the original size "A4" is 210 mm horizontally× 297 mm vertically, and the original size "Letter" is 215.9 mm horizontally×279.4 mm vertically. Therefore, in step S703, the vertical length of the poster image with the pre-change original size "A4" is reduced to match the vertical length of the poster image with the post-change original size "Letter", so that the poster image fits in the post-change original size "Letter". Then, the poster image is arranged at the center of the post-change original size "Letter" in the width direction. A region 903 is a region corresponding to the reduced poster image 901.

In step S704, the CPU 101 obtains a run-over width value 904 between the poster image 902 and the region 903. As shown in FIG. 9, the run-over width value 904 is the length in the width direction.

Thereafter, processing of steps S705 to S708 is executed with respect to each object inside the poster image 902.

In step S705, the CPU 101 determines whether the object inside the poster image 902 is an object that is in contact with or runs over an outer frame of the region 903. Here, if the object is not an object that is in contact with or runs over the outer frame of the region 903, the object is an object that is not in contact with and does not run over the outer frame of the region 903.

FIG. 10 is a diagram showing each object in the poster image 902. As shown in FIG. 10, the objects that are in contact with or run over the outer frame of the region 903 are a shape 1001, an image 1002, and text 1003. In a case where the object has been determined to be an object that is not in contact with and does not run over the outer frame of the region 903 in step S705, processing proceeds to step S708. On the other hand, in a case where the object has been determined to be an object that is in contact with or runs over the outer frame of the region 903, processing proceeds to step S706.

In step S706, the CPU 101 determines whether the type of the target object is one of an image, a shape, and a background. In a case where the type of the object is one of an image, a shape, and a background, it is determined that the size of this object is to be changed. On the other hand, in a case where the object is none of an image, a shape, and a background, it is determined that the size of this object is not to be changed.

It can be said that an object that is in contact with or runs over the outer frame of the region 903 is a layout where an outer frame of the object has been taken into consideration. Therefore, it is desirable to arrange this object along the outer frame of the poster image, even if the original size has been changed. Meanwhile, regarding specific types of objects, in some cases it is not desirable for them to be in contact with or run over the outer frame of the poster image from the viewpoint of printing. For example, regarding text and two-dimensional codes, there is a possibility that the user cannot be provided with accurate information if they are in contact with or run over the outer frame of the poster image. For this reason, it is desirable to arrange such objects inside the poster image whenever possible. Therefore, in the present embodiment, it is determined that the size of the object is to be changed in a case where this object is an object that is in contact with or runs over the outer frame of the region 903 and this object is an object that represents one of an image, a shape, and a background. Then, the size of the object is changed so that the object is in contact with the outer frame of the post-change original size. On the other hand, in a case where the object is an object that is in contact with or runs over the outer frame of the region 903 and the object is not an object that represents one of an image, a shape, and a background, it is determined that the size of this object is not to be changed. That is to say, the object remains arranged inside the post-change original size. Regarding FIG. 10, it is determined that the size of the object is to be changed with respect to the shape 1001 and the image 1002, and it is determined that the size of the object is not to be changed with respect to the text 1003.

In a case where it is determined that the type of the object is one of an image, a shape, and a background in step S706, processing proceeds to step S707. On the other hand, in a case where it is determined that the type of the object is none of an image, a shape, and a background, processing proceeds to step S708.

In step S707, the CPU 101 changes the size of the object that has been determined to be changed by the run-over width value 904 obtained in step S704.

FIG. 11 is a diagram showing the poster image 902 for which processing of step S707 has been executed. As the left side and the right side of the shape 1001 were in contact with the outer frame of the region 903, the position of the left side has been moved to the left by the run-over width value 904, and the position of the right side has been moved to the right by the run-over width value 904. Although the upper side of the shape 1001 was in contact with the outer frame of the region 903, it is not moved because the upper side of the region 903 and the upper side of the poster image 902 match. As only one side of the image 1002, namely the right side thereof, was in contact with the outer frame of the region 903, only the position of the right side has been moved to the right by the run-over width value 904.

Also, in a case where the right side of the image 1002 runs over the region 903, which is not the case shown in FIG. 10, it is determined that the object runs over in step S705, and processing proceeds to step S707 by way of step S706. In this case, the right side is moved further to the right from the run-over location by the run-over width value 904. At this time, in a case where the run-over value at the run-over location is already larger than the run-over value 904, the position of the right side of the image 1002 may not be moved. Furthermore, in a case the size change has been made, image editing processing, such as cropping, may be executed so that the aspect ratio of the image is not changed.

In step S708, the CPU 101 determines whether processing of steps S705 to S707 has been executed with respect to every object inside the poster image 902. In a case where it is determined that processing of steps S705 to S707 has not been executed with respect to every object, processing is repeated from step S705. On the other hand, in a case where it is determined that processing of steps S705 to S707 has been executed with respect to every object, processing proceeds to step S709.

Figure 12:
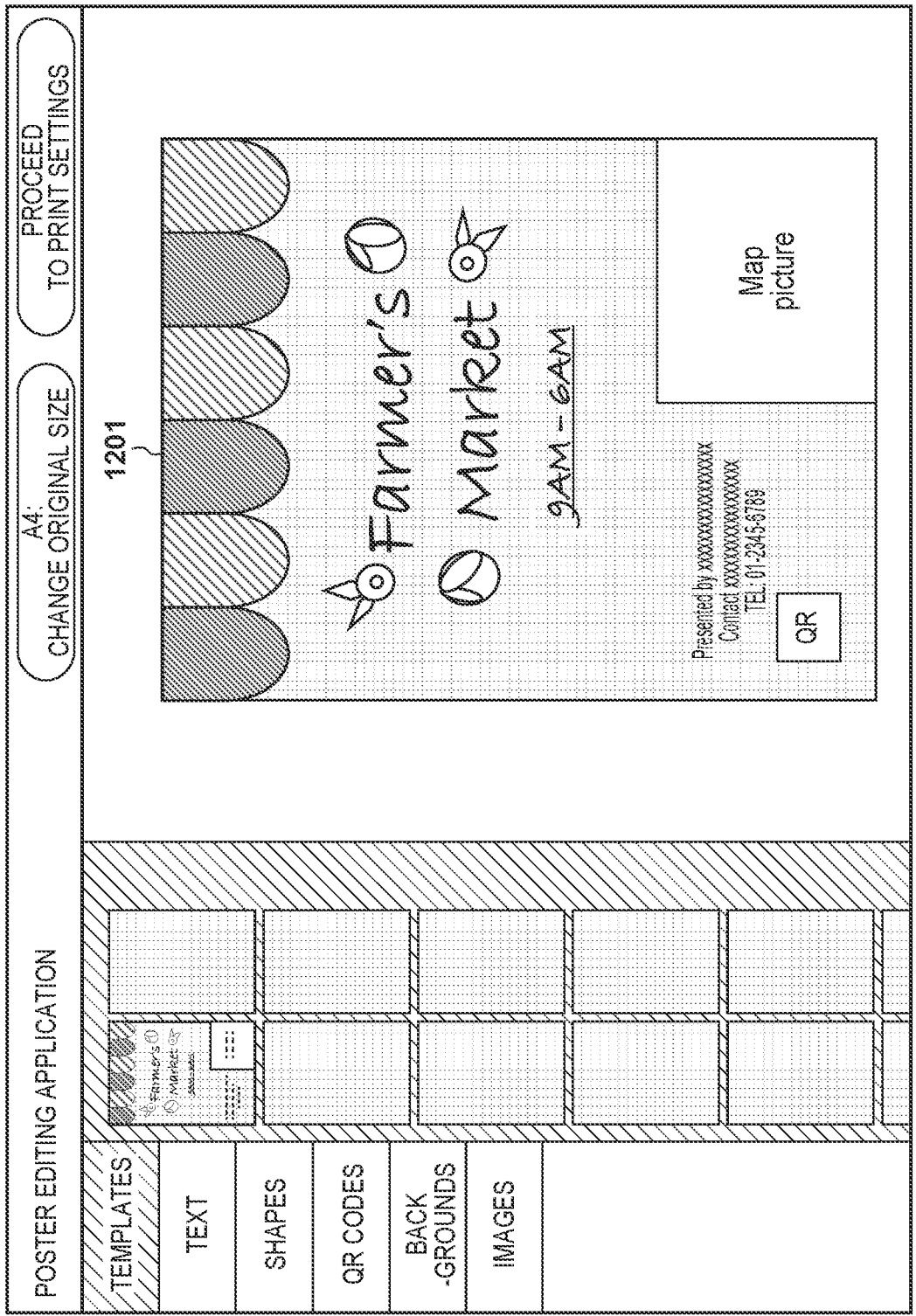
FIG. 12 is a diagram showing a user interface screen.

In step S709, the CPU 101 displays a layout result on the editing screen. FIG. 12 is a diagram showing an example of display of the poster image with the post-conversion original size. A poster image 1201 of FIG. 12 corresponds to the poster image 902 of FIG. 11, and corresponds to the poster image after the original size has been converted from the poster image 411 of FIG. 4. It is apparent that, compared to the poster image 601 of FIG. 6, the poster image 1201 of FIG. 12 does not include margins in the width direction.

As described above, the present embodiment can prevent a deformation (change) of a layout that occurs in a case where a change to an original size with a different aspect ratio has been made. Specifically, by changing the size of the object as per the description of step S707, the relationship between the outline of the object and the outer frame of the original size under the pre-change original size is maintained also under the post-change original size. Furthermore, although a change in the size of the object has been described as a change in the layout in the present embodiment, the layout may be changed using other methods, for example, by moving the object.

In the description of step S703, the poster image with the pre-conversion original size is reduced. However, in step S703, the poster image with the pre-change original size may be enlarged. For example, the horizontal length of the poster image with the pre-change original size "A4" may be enlarged to match the horizontal length of the poster image with the post-change original size "Letter", and the poster image may be arranged at the center of the post-change original size "Letter" in the vertical direction.

Figure 13:
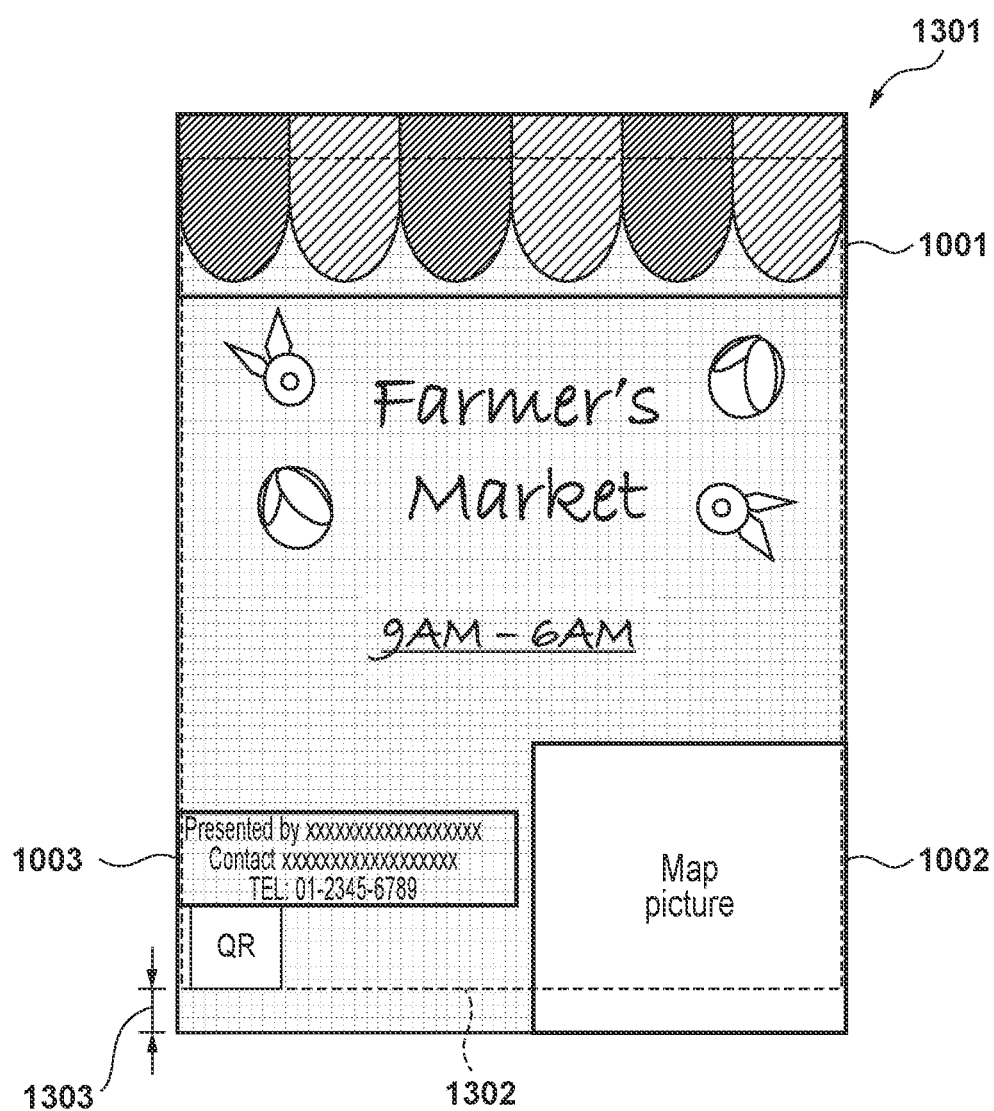
FIG. 13 is a diagram showing a layout of each object.

FIG. 13 is a diagram showing a state where the poster image with the pre-change original size has been enlarged in step S703. The poster image 1301 of FIG. 13 is the result of enlarging the poster image 901 of FIG. 9. Also, a region 1302 is a region corresponding to the original size "Letter". In a case where the enlargement has been performed in step S703, the shape 1001 and the image 1002 run over the outer frame of the region 1302 as shown in FIG. 13. In the present case, the CPU 101 obtains a run-over width value 1303 of FIG. 13 in step S704. As shown in FIG. 13, the run-over width value 1303 is obtained as a value in the vertical direction. In step S705, the CPU 101 determines whether the object inside the enlarged poster image 1301 is an object that runs over the outer frame of the region 1302. In a case where it is determined that the object runs over and it is also determined that the object is an object of a predetermined type in step S706, the object to be changed in size is changed in size by the run-over width value 1303, which has been obtained in step S704, in step S707. For example, the position of the upper side of the shape 1001 is moved downward by the run-over width value 1303. Also, for example, the position of the lower side of the image 1002 is moved upward by the run-over width value 1303. Furthermore, whether the poster image 901 is reduced or enlarged in step S703, the user may be enabled to designate the object to be changed in size. For example, the user may be enabled to designate the type of the object that satisfies the condition in step S706.

As described above, according to the present embodiment, when the original size is to be changed, the sizes of objects are changed without a user operation; consequently, the layout of the objects can be made appropriate for the post-change original size, and convenience can be improved. Furthermore, this configuration eliminates the need to prepare a template for appropriately arranging the objects for each original size; this can prevent an increase in the amount of template data.

Second Embodiment

The following describes a second embodiment with a focus on the differences from the first embodiment. In the first embodiment, the determination is made based on the fact that the object is of a predetermined type as in step S706 of FIG. 7, and the size of the object is changed by the run-over width value 904 of FIG. 9. However, there is a case where it is not desirable to change the aspect ratio even in the case of an object of a predetermined type. For example, in the case of an image object that the user wants to use as a logo mark, a change in the aspect ratio and cropping are not favorable. In view of this, the present embodiment will be described in relation to a configuration in which the user can change the method of changing the size on a per-object basis.

Figure 15:
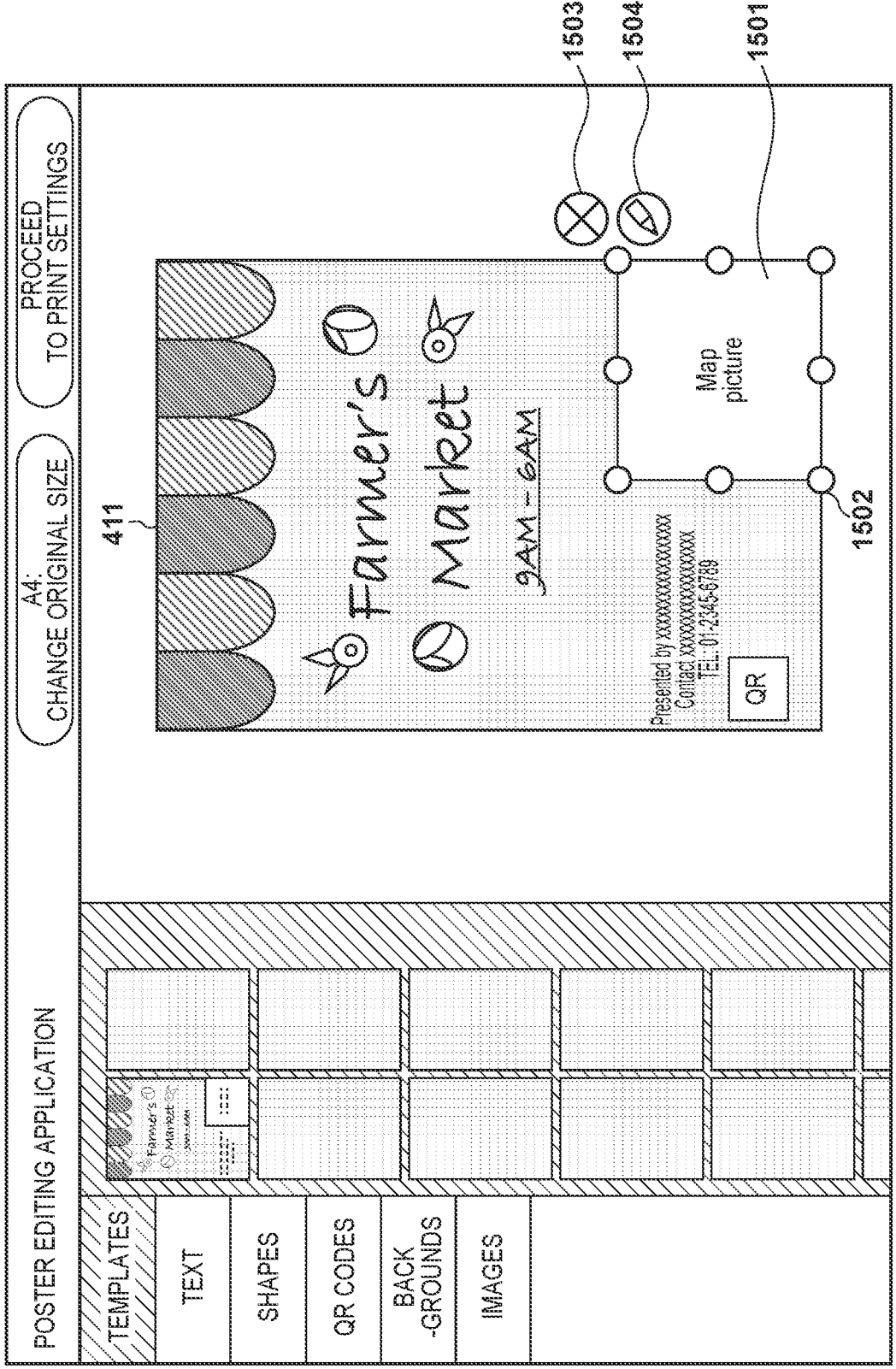
FIG. 15 is a diagram showing a user interface screen.
Figure 16:
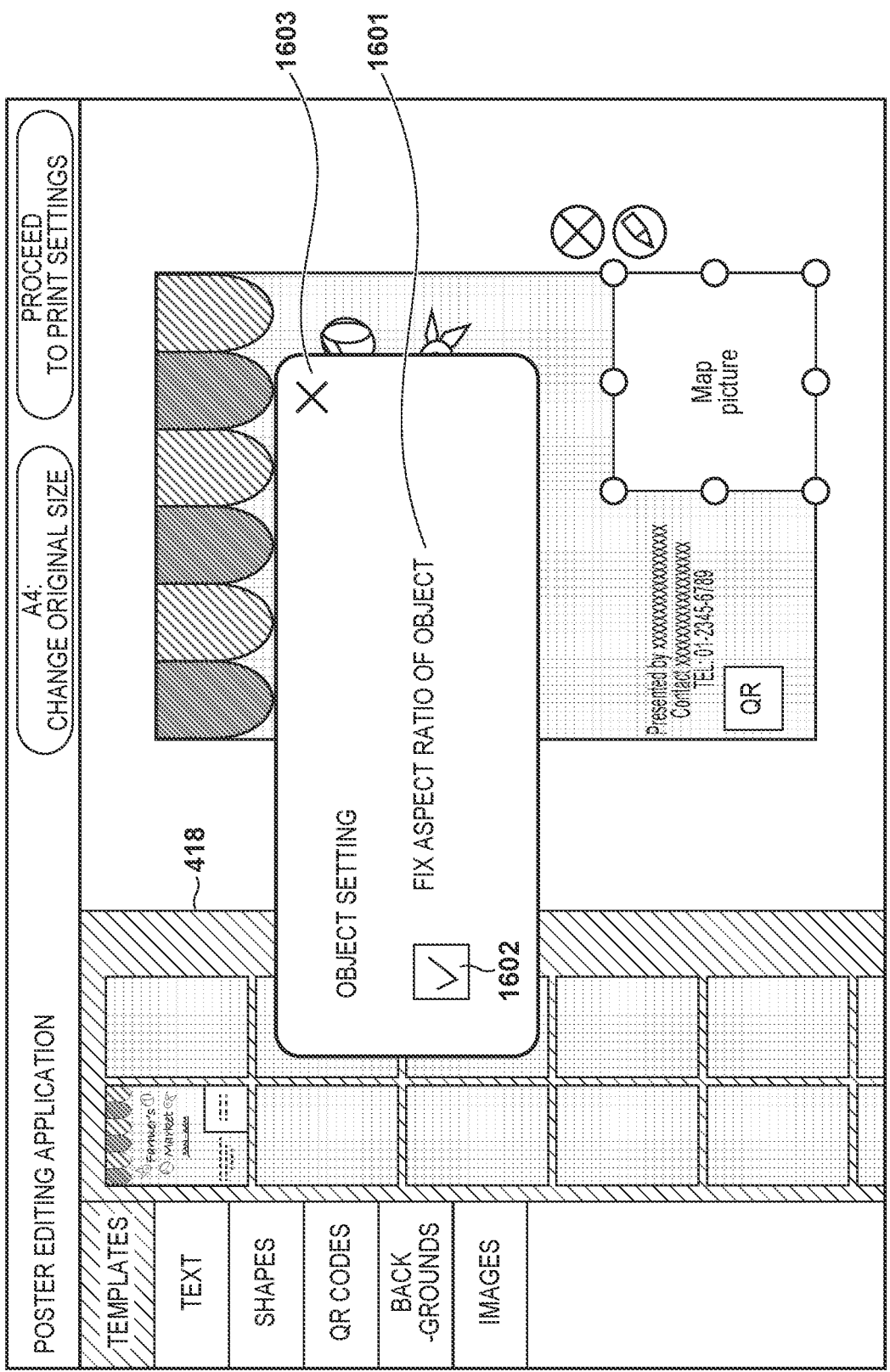
FIG. 16 is a diagram showing a user interface screen.

FIG. 15 is a diagram showing one example of a state where an image object inside the poster image 411 has been selected on the editing screen of FIG. 4. An image object 1501 is an object that is currently selected inside the poster image 411. A control 1502 is a button for resizing the image object 1501. A button 1503 is a button for deleting the image object 1501 that is currently selected. A button 1504 is a button that is intended for the user to configure a setting for the object. FIG. 16 shows a screen of a case where the button 1504 has been selected.

A dialog 1601 of FIG. 16 is a dialog for configuring a setting for the object. A setting about whether to fix the aspect ratio of the image object 1501 can be configured by the user's selection of a checkbox 1602. In other words, the checkbox 1602 can accept an instruction about whether to permit a change in the aspect ratio. Note that a default value of the checkbox 1602 may be set by the application 2 in advance. A button 1603 is a button for closing the dialog 1601.

Figure 14:
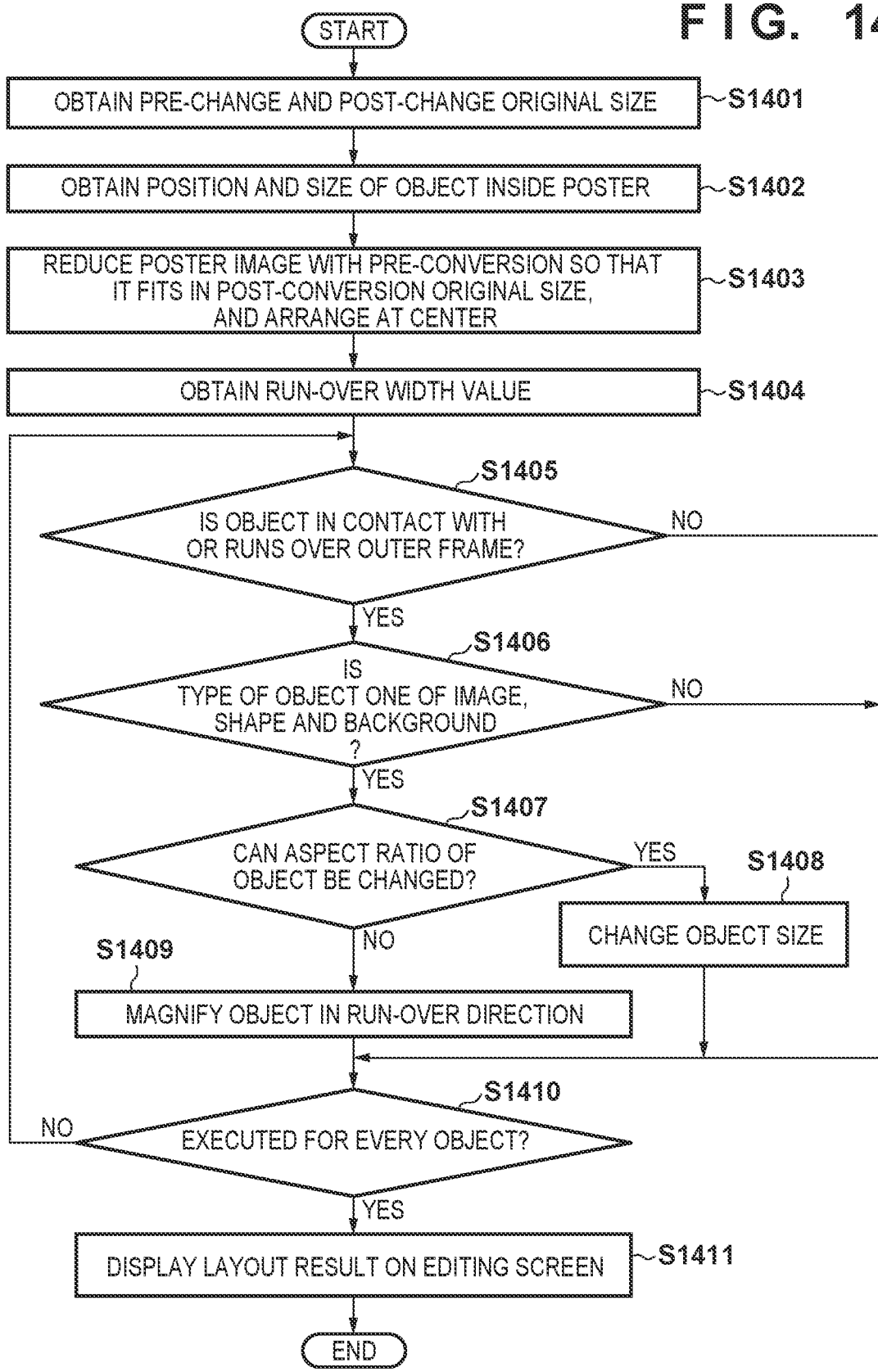
FIG. 14 is a flowchart showing processing for changing an original size.

FIG. 14 is a flowchart showing processing for changing the original size in the present embodiment. The processing of FIG. 14 is realized by, for example, the CPU 101 reading out a program stored in the ROM 102 and executing the program.

As steps S1401 to S1406 are the same as the description of steps S701 to S706 of FIG. 7, a description thereof is omitted.

In step S1407, the CPU 101 determines whether the aspect ratio of the object can be changed. For example, in a case where the setting of the checkbox 1602 in the dialog 1601 is the setting that does not fix the aspect ratio, the CPU 101 determines that the aspect ratio can be changed. In a case where it is determined that the aspect ratio can be changed in step S1407, the CPU 101 executes processing similar to step S707 of FIG. 7 in step S1408. On the other hand, in a case where it is determined that the aspect ratio cannot be changed in step S1407, processing proceeds to step S1409.

In step S1409, the CPU 101 applies variable magnification to the object in the run-over direction while maintaining the aspect ratio.

Figure 17:
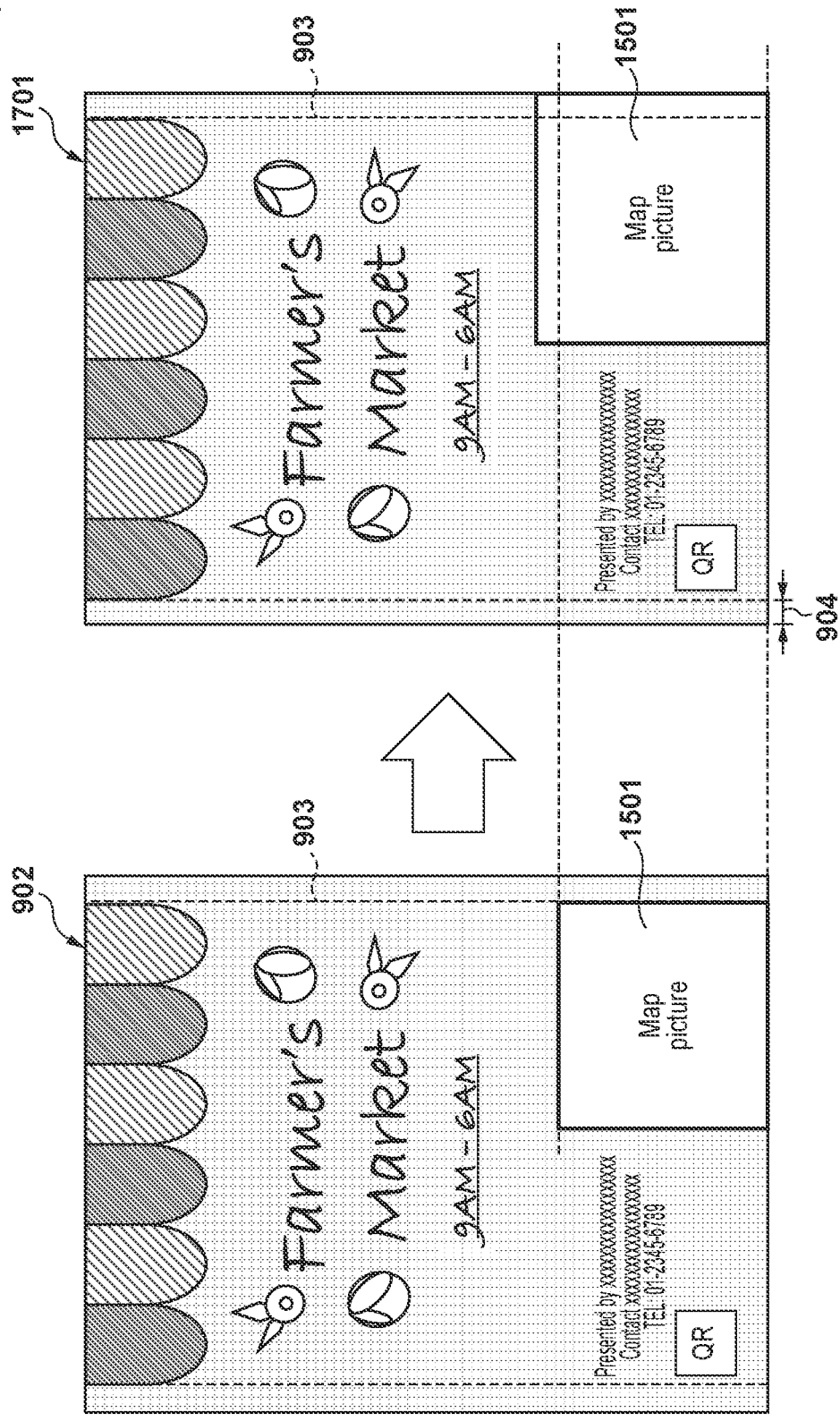
FIG. 17 is a diagram for describing a change in an original size.

FIG. 17 is a diagram showing the poster image of a case where processing of step S1409 has been executed. As shown in the poster image 902 of FIG. 17, the right side of the image object 1501 is in contact with the outer frame of the region 903. In step S1409, the image object 1501 is enlarged until the position of the right side thereof comes into contact with the outer frame of a poster image 1701 without changing the aspect ratio. The poster image 1701 represents a state where the position of the right side of the image object 1501 has been changed while maintaining the aspect ratio of the image object 1501.

As steps S1410 and S1411 are the same as the description of steps S708 and S709 of FIG. 7, a description thereof is omitted.

As described above, according to the present embodiment, the user can set whether to fix the aspect ratio on a per-object basis. With this configuration, a layout change that conforms with the user's intention can be made.

Third Embodiment

The following describes a third embodiment with a focus on the differences from the first and second embodiments. In a case where users who live in various areas use the same application 2, the sizes that are used may vary even if the template is the same. For example, the same template may have different sizes in Japan and the United States. In the present embodiment, when a user has selected a template, an original size is changed automatically from a default size based on area information of the user and information of the selected template, and the template with the changed original size is displayed on an editing screen.

Figure 18:
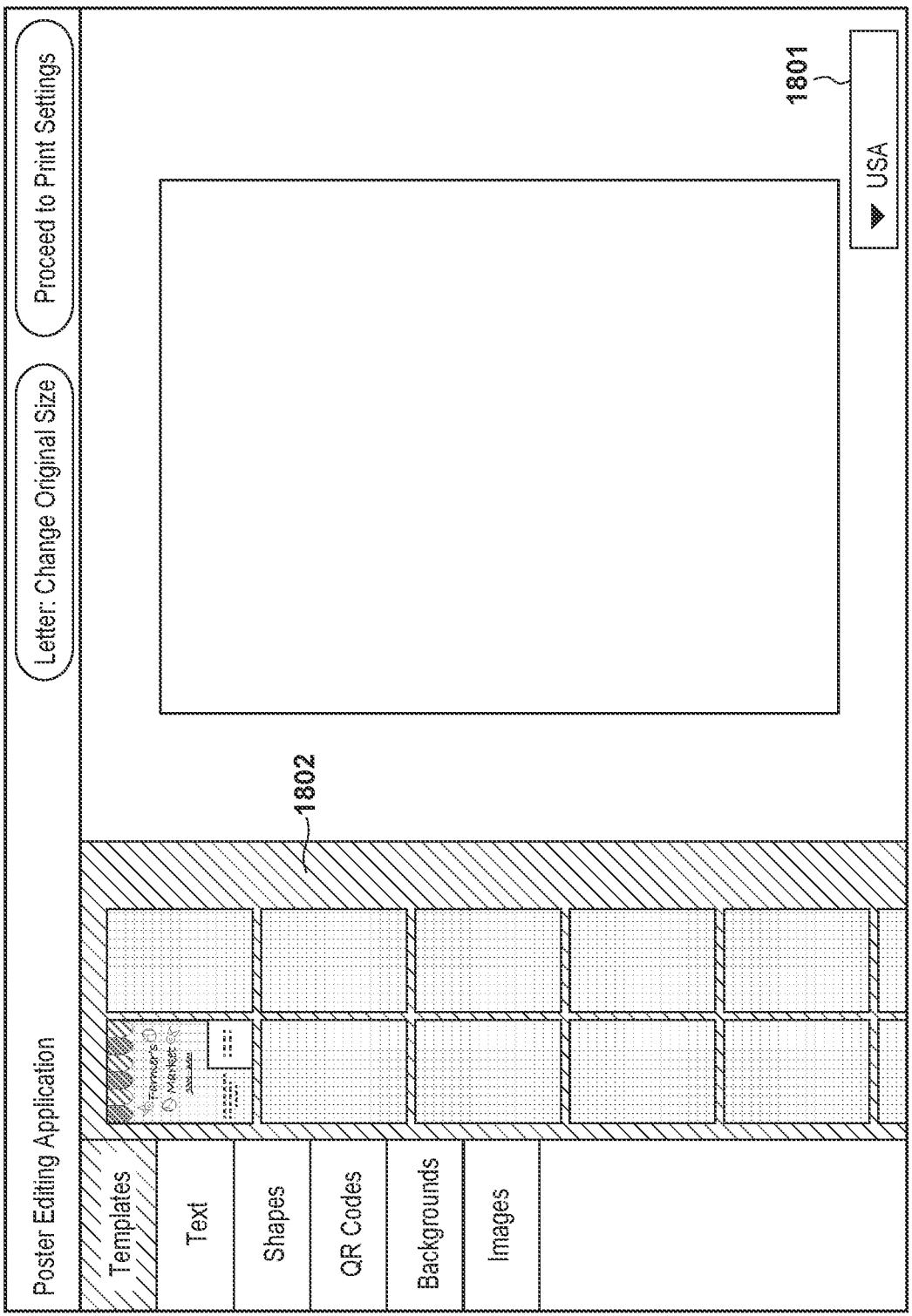
FIG. 18 is a diagram showing a user interface screen.

FIG. 18 is a diagram showing an example of an editing screen of the application 2 in the United States. A button 1801 is a button that is intended for a user to change an area setting. The user can set any area using the button 1801.

Note that the area setting on the application 2 may be configured using other methods. For example, information of an area in which the PC 100 of the user exists, such as an IP address, may be obtained. A region 1802 is a template selection area, and the user can select any template therefrom.

Figure 19:
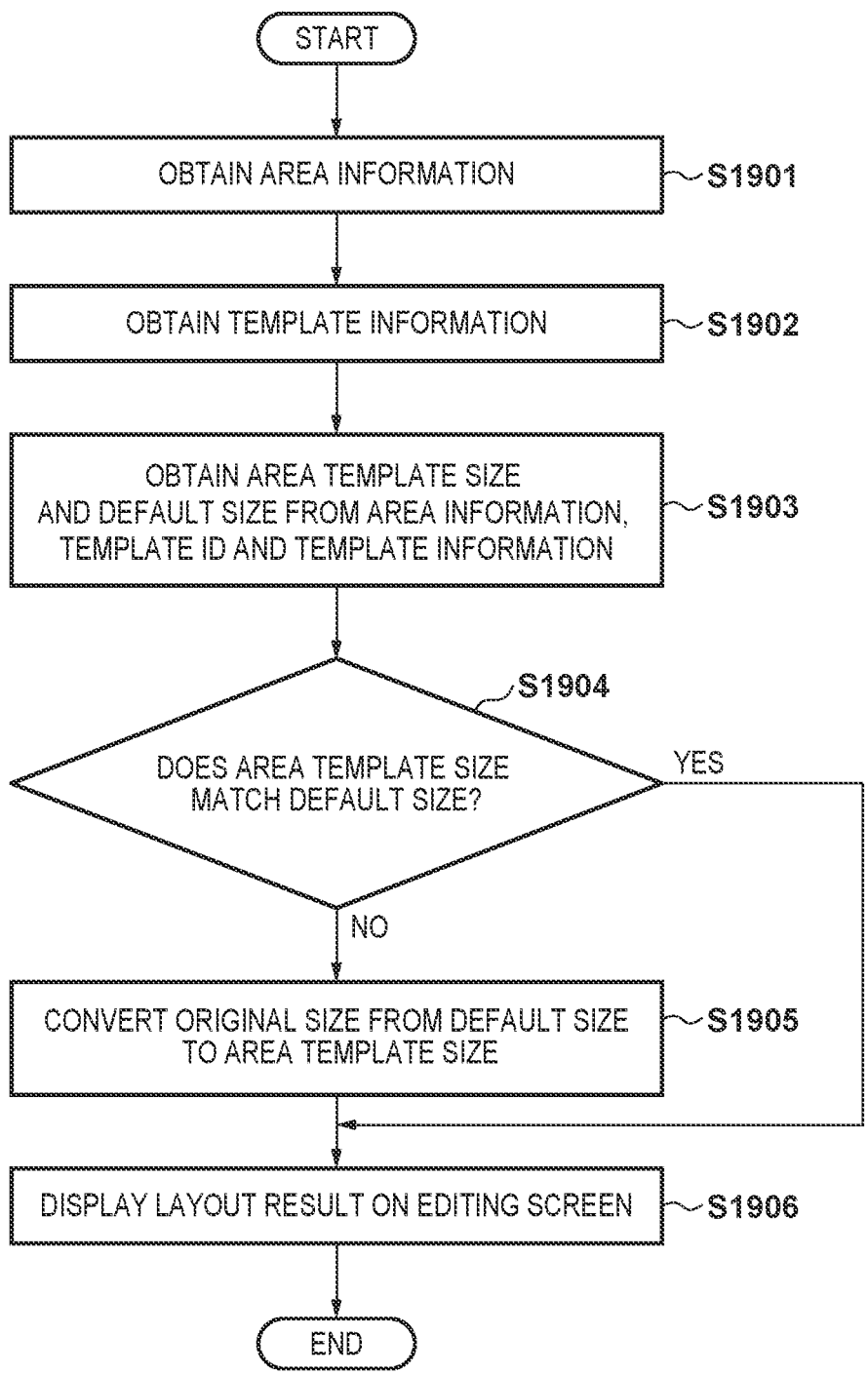
FIG. 19 is a flowchart showing processing for changing a template size.

FIG. 19 is a flowchart showing processing that is executed in a case where any template has been selected from the region 1802. The processing of FIG. 19 is realized by, for example, the CPU 101 reading out a program stored in the ROM 102 and executing the program.

In step S1901, the CPU 101 obtains area information. The area information is obtained based on, for example, setting information related to the button 1801 of FIG. 18 and an IP address of the PC 100.

In step S1902, the CPU 101 obtains template information. In the present embodiment, the application 2 holds template information 2000 of FIG. 20.

FIG. 20 is a diagram showing an example of the template information 2000. A column 2001 shows IDs for identifying templates, which correspond to the respective templates displayed in the region 1802. A column 2002 shows default values (default sizes) of the original sizes of the templates tied to the template IDs held in the application 2. A column 2003 shows template sizes that are used in the USA as an area. A column 2004 shows template sizes that are used in JP as an area. Note that the default sizes may be different from, or may be the same as, the template sizes of each area.

In step S1903, the CPU 101 determines an area template size to be displayed on the application 2 from the template ID selected by the user, the area information obtained in step S1901, and the template information obtained in step S1902. Here, the area template size denotes a template size corresponding to the area of the user. For example, in the present embodiment, it is assumed that the user who lives in the USA has selected a template with a template ID "B" in the region 1802. In this case, as the area is the USA, the "Letter" size is determined as the area template size from the template information 2000 of FIG. 20. Also, the default size of the template with the template ID "B" is the "A4" size. Note that although the present embodiment depicts a case where the default size is one of the area template sizes, no limitation is intended by this configuration. For example, it is permissible to generate, in advance, template data of an intermediate size between "A4" and "Letter" sizes, and use this intermediate size as a default size. With this configuration, no matter which area has been selected, the distances over which the objects are moved at the time of layout change are reduced on average, and more natural layout change can be made.

In step S1904, the CPU 101 determines whether the area template size obtained in step S1903 and the default size match. In a case where it is determined that they do not match, processing proceeds to step S1905. On the other hand, in a case where it is determined that they match, processing proceeds to step S1906, and the CPU 101 displays the template with the default size on the editing screen of the application 2.

In step S1905, the CPU 101 changes the original size from the default size to the area template size. At this time, the object layout is changed in a manner similar to the first and second embodiments. That is to say, the operation of the size change of the poster image in the first and second embodiments is applied to the size change of the template in the present embodiment. Then, in step S1906, the CPU 101 displays the template with the area template size after the object layout has been changed on the editing screen of the application 2.

As described above, according to the present embodiment, a template in which objects are appropriately laid out can be displayed in a template size that is suitable for an area in which a user resides, and convenience can be improved for the user in editing the template.

While the PC 100 has been described as an apparatus that displays the editing screen of the application 2 in each embodiment, it is also realized by another apparatus. For example, a smartphone, a tablet, an image processing apparatus such as a printer, an Internet KIOSK terminal, or the like may be used in place of the PC 100. Furthermore, although a poster generation application has been described as an example of the application 2, no limitation is intended by poster generation, and the operations of each embodiment are also applicable to other image editing applications.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-158761, which was filed on Sep. 30, 2022 and which is hereby incorporated by reference herein in its entirety.

What is claimed is:

1. An information processing apparatus comprising:
at least one memory and at least one processor configured to:
cause a display device to display an image indicated by image data;

accept a change in an original size of the image displayed on the display device;

cause a method of changing a size of an object included in the image data to vary based on a setting of the object, wherein the setting is a setting about whether to permit a change in an aspect ratio of the object included in the image data;

in a case where a change from a first original size to a second original size that is different from the first original size in an aspect ratio has been accepted as the change, change a layout of the object included in the image data, based on the second original size, by changing the size of the object, wherein in a case where the setting has been configured not to permit the change in the aspect ratio of the object included in the image data, the size of the object is changed by applying variable magnification to the object while maintaining the aspect ratio of the object; and cause the display device to display the image in the second original size based on the object whose layout has been changed.

2. The information processing apparatus according to claim 1, wherein the at least one memory and the at least one processor are further configured to:

change the size of the object included in the image data so that a relationship between an outline of the object and an outer frame of the first original size is still maintained after the change from the first original size to the second original size.

3. The information processing apparatus according to claim 2, wherein the at least one memory and the at least one processor are further configured to:

in a case where the outline of the object included in the image data is in contact with the outer frame of the first original size, change the size of the object included in the image data so that the outline comes into contact with an outer frame of the second original size.

4. The information processing apparatus according to claim 1, wherein the at least one memory and the at least one processor are further configured to:

in a case where the setting has been configured to permit the change in the aspect ratio of the object included in the image data, change the size of the object by moving a position of at least one side of an outline of the object.

5. The information processing apparatus according to claim 1, wherein the object whose layout is to be changed is a predetermined object.

6. The information processing apparatus according to claim 5, wherein the predetermined object is an object corresponding to at least one of an image, a shape, and a background.

7. The information processing apparatus according to claim 1, wherein the image data is data indicating a template.

8. The information processing apparatus according to claim 7, wherein the at least one memory and the at least one processor are further configured to store information in which a default size of the template is associated with a size of the template corresponding to an area.

9. The information processing apparatus according to claim 8, wherein the at least one memory and the at least one processor are further configured to:

obtain area information indicating an area in which the information processing apparatus exists;

determine whether the default size of the template is to be changed based on the area information;

in a case where the default size of the template is to be changed, change the layout of the object included in the data indicating the template based on a size corresponding to the area indicated by the area information; and cause the display device to display the template in the size corresponding to the area indicated by the area information based on the object whose layout has been changed.

10. A method executed on an information processing apparatus, the method comprising:

causing a display device to display an image indicated by image data;

accepting a change in an original size of the image displayed on the display device;

causing a method of changing a size of an object included in the image data to vary based on a setting of the object, wherein the setting is a setting about whether to permit a change in an aspect ratio of the object included in the image data;

in a case where a change from a first original size to a second original size that is different from the first original size in an aspect ratio has been accepted, changing a layout of the object included in the image data, based on the second original size, by changing the size of the object, wherein in a case where the setting has been configured not to permit the change in the aspect ratio of the object included in the image data, changing the size of the object includes applying variable magnification to the object while maintaining the aspect ratio of the object; and causing the display device to display the image in the second original size based on the object whose layout has been changed.

11. A non-transitory computer-readable storage medium storing computer-executable instructions that, when executed by a computer, cause the computer to:

cause a display device to display an image indicated by image data;

accept a change in an original size of the image displayed on the display device;

cause a method of changing a size of an object included in the image data to vary based on a setting of the object, wherein the setting is a setting about whether to permit a change in an aspect ratio of the object included in the image data;

in a case where a change from a first original size to a second original size that is different from the first original size in an aspect ratio has been accepted, change a layout of the object included in the image data, based on the second original size, by changing the size of the object, wherein in a case where the setting has been configured not to permit the change in the aspect ratio of the object included in the image data, changing the size of the object includes applying variable magnification to the object while maintaining the aspect ratio of the object; and cause the display device to display the image in the second original size based on the object whose layout has been changed.

* * * * *